United States Patent [19]

Burmeister et al.

[11] Patent Number: 4,538,935
[45] Date of Patent: Sep. 3, 1985

[54] BALL AND SOCKET JOINT, PARTICULARLY FOR HEAVILY LOADED JOINT LINKAGES IN MOTOR VEHICLES

[75] Inventors: Joachim Burmeister, Bad Essen; Reinhard Buhl, Bohmte; Paul Westphal, Lemförde, all of Fed. Rep. of Germany

[73] Assignee: Lemförder Metallwaren AG, Fed. Rep. of Germany

[21] Appl. No.: 603,581

[22] Filed: Apr. 25, 1984

[30] Foreign Application Priority Data

Apr. 29, 1983 [DE] Fed. Rep. of Germany ....... 3315718

[51] Int. Cl.³ .............................................. F16C 11/00
[52] U.S. Cl. ..................................... 403/140; 403/135
[58] Field of Search ............... 403/133, 135, 140, 137, 403/132, 138

[56] References Cited

U.S. PATENT DOCUMENTS

| 3,063,744 | 11/1962 | Flumerfelt | 403/133 |
| 3,216,754 | 11/1965 | Smith et al. | 403/140 X |
| 3,817,640 | 6/1974 | Carter et al. | 403/138 |
| 4,163,617 | 8/1979 | Nemoto | 403/135 X |

Primary Examiner—Andrew V. Kundrat
Attorney, Agent, or Firm—McGlew and Tuttle

[57] ABSTRACT

A ball and socket joint for heavily loaded joint linkages in motor vehicles, comprises a ball stud with a spherical head, a socket embracing the spherical head and made of a material with limited elasticity, and a casing accommodating the socket and sealingly closed, on its side opposite to the ball stud, with a cambered cover of sheet metal. The cover applies by its inside and under biasing load against the deformable socket. In its portion contacting the socket, the cover is formed with a camber producing the effect that if the joint is loaded axially increasingly from the ball stud, the cover expands and becomes more tightly clamped in the casing.

4 Claims, 1 Drawing Figure

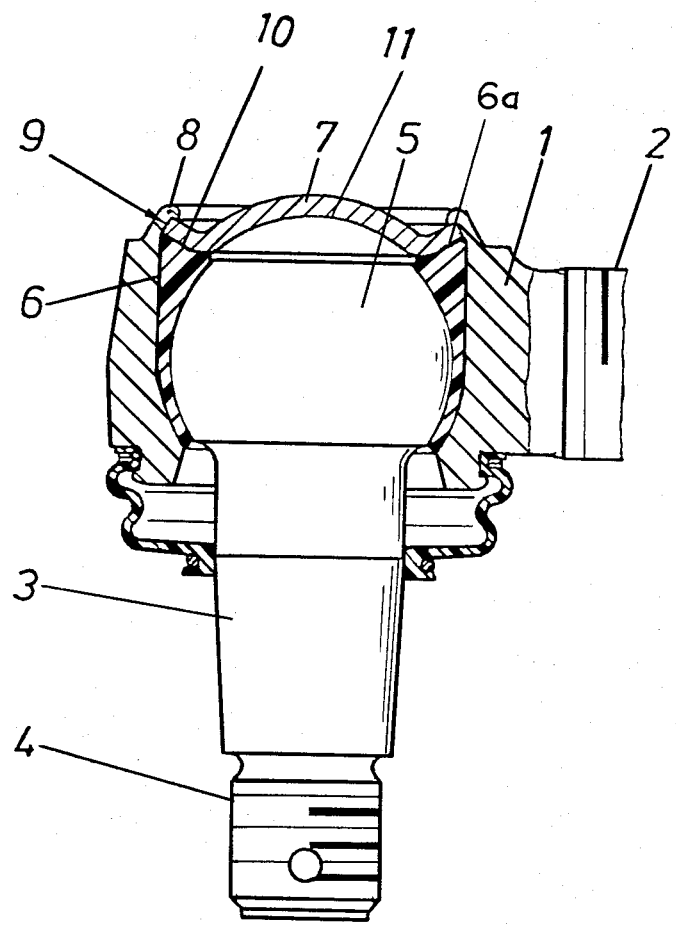

BALL AND SOCKET JOINT, PARTICULARLY FOR HEAVILY LOADED JOINT LINKAGES IN MOTOR VEHICLES

FIELD AND BACKGROUND OF THE INVENTION

This invention relates in general to pivotal joints and in particular to a new and useful ball and socket joint having an elastic socket contained in the casing accommodating the ball head of a stud member which has a top end portion having a rim which extends obliquely and upwardly toward the end which is enclosed under biasing pressure by a cover having a rim which extends obliquely upwardly and is held in place by a flange of the casing.

A similar ball and socket joint is shown and described in German AS No. 10 14 441, only, in this prior art design, the biasing load is transmitted by means of a helical spring clamped between the cover and a disc, to an annular body or a socket being in direct surface contact with the disc. The rim of the cover extends in the cover plane parallel to the equatorial plane of the spherical head and engages in a circumferential groove of a cylindrical recess of the casing, where it is retained by a flange which thus must take up the load bearing in the axial direction of the ball stud. A central chamber of the cover merely provides for a clearance permitting free movements of the spherical head in the carrow casing. This prior art further provides a circular protrusion on the inside of the cover serving the purpose of centering either a helical spring or an inner ring for biasing the socket.

SUMMARY OF THE INVENTION

The invention is directed to a ball joint construction in which the cover is secured by its rim in the casing in a manner such that the cover rim becomes stronger when clamped in the casing when the load bearing in the axial direction of the ball stud is increased.

In accordance with the invention a ball and socket joint comprises a ball stud which has a spherical head portion which is accommodated within a socket member made of a material having limited elasticity which embraces the socket member completely around the head portion. The socket member has an upwardly and outwardly cambered top edge which extends around the ball head and is accommodated within a socket housing or casing which has a flanged edge which overlies a central cover member which has a peripheral rim which extends upwardly and outwardly.

This design produces the effect that the joint loading forces transmitted to the cover are transformed into an expansion in diameter of the cover, so that with an increasing load on the joint, the cover extends proportionally, with the load component which is directed radially outwardly being taken up by the ball of the mostly cylindrical casing. This means that the flange of the casing is relieved, which is a considerable advantage, particularly if strong forces are produced in the joint.

A feature to be pointed out particularly is that the casing surface taking up the expanding force is inclined toward the axis of the ball stud in the load direction. At the same time, the cross sectional area of the cover rim should be pointed against a bearing surface extending on the inner circumference of the casing about perpendicularly to the direction of expansion of the cover. Transverse forces, which might be produced in the contact area and would unfavorably affect the film seat of the cover in the casing, are thereby eliminated.

Accordingly, it is an object of the invention to provide an improved pivotal joint which includes a ball stud member having a spherical ball head which is accommodated on a socket of elastic material within a casing and wherein the casing is closed by a cover which overlies the ball head and has an outwardly and upwardly cambered rim which engages against a similarly outwardly and upwardly cambered edge of the socket member of resilient material and wherein the cover is enclosed by a flanged edge of the casing.

A further object of the invention is to provide a pivotal joint which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a sectional view of a pivotal joint constructed in accordance with the invention.

DESCRIPTION OF THE PREFERRED EMBODIMENT

Referring to the drawing in particular, the invention embodied therein comprises a socket joint which includes a casing 1 containing a ball head 5 of a ball stud 3 which has a pin portion 4. In accordance with the invention a socket member 6 made of a material having limited elasticity embraces and extends completely around the ball head and has an upwardly and outwardly cambered edge 6a which extends completely around the ball head adjacent the top thereof. Cambered edge 6a is inclined generously toward a center of the ball head 5. The cover 7 of sheet metal material overlies the ball head 5 and sealingly closes the casing. The cover has a marginal edge portion 10 which is cambered upwardly and outwardly and overlies substantially all of the cambered top edge 6a of the socket member 6. Casing 1 has an annular flange 9 which a flange edge overlying the top edge of the cover 7. The cover is biases against the socket member 6 and it has an edge engaging the casing flange 9.

The ball and socket joint thus comprises casing 1 having outside a threaded neck 2 for connecting another component part. The ball includes ball stud 3 and securing pin portion 4 and a spherical head portion 5. Socket 6 made of a material of limited elasticity embraces the spherical head 5 within the casing 1. At the casing side remote from ball stud 3, the casing is closed with cover 7 of sheet metal or the like. The cover 7 is inserted in casing 1 in a biased state and is held in place by a flange edge 8, so that the cover exerts a pressure on a socket 6 and keeps it strained. In its portion 10 contacting socket 6, cover 7 is cambered and the camber produces a force tending to expand the cover as soon as a load is applied from the inside joint, in the axial direction of the ball stud 3.

In the shown embodiment, camber 10 protrudes inwardly, and a load acting in the axial direction of the ball stud 3 acts to enlarge the diameter of cover 7, so that the rim of the cover is more firmly pressed against casing 1. This effect is still improved if the respective casing surface taking up the expanding forces is inclined toward the axis of the ball stud in the loading direction. It is advantageous to have a cover rim 9 of cover 7 applied against a surface which is about perpendicular to the direction of expansion of the cover. This eliminates transverse forces in this area which would unfavorably affect the firm seating of the cover 7 in the casing 1. A dome-shaped central area 11 of the cover 7 which is not in contact with socket 6, cover 7 is cambered outwardly. Consequently, the overall size of the joint is minimized without limiting the free movements of the spherical head within the casing.

While a specific embodiment of the invention has been shown and described in detail to illustrate the application of the principles of the invention, it will be understood that the invention may be embodied otherwise without departing from such principles.

What is claimed is:

1. A ball and socket joint, comprising a ball stud having a spherical head portion, a socket member made of a material having limited elasticity embracing and extending completely around said head portion and having an upwardly and outwardly cambered top edge extending around said ball head, a casing accommodating and surrounding said socket, a cover of a sheet metal material overlying said ball head and sealingly closing said casing, said cover having an outer edge and an annular marginal edge portion cambered parallel to, overlying and substantially covering said cambered top edge of said socket member, said casing having an annular flange portion overlying said outer edge of said cover, said cover being biased against said socket member and having its outer edge engaging said casing flange portion, said outer edge and said engaging flange portion extending substantially perpendicularly to said cambered top edge and annular marginal edge portion.

2. A ball and socket joint according to claim 1, wherein said cover includes a dome-shaped central area connected to said annular marginal edge portion, said casing flange portion including a flange edge overlying said outer edge of said cover.

3. A ball and socket joint, according to claim 1, wherein said casing has a surface opposite to said cover which takes up the forces produced by the expansion thereof and is inclined relative to the axis of said ball stud in the load direction.

4. A ball and socket joint according to claim 1, wherein in an area adjacent said socket, said camber of said cover protrudes inwardly.

* * * * *